Figure 1:
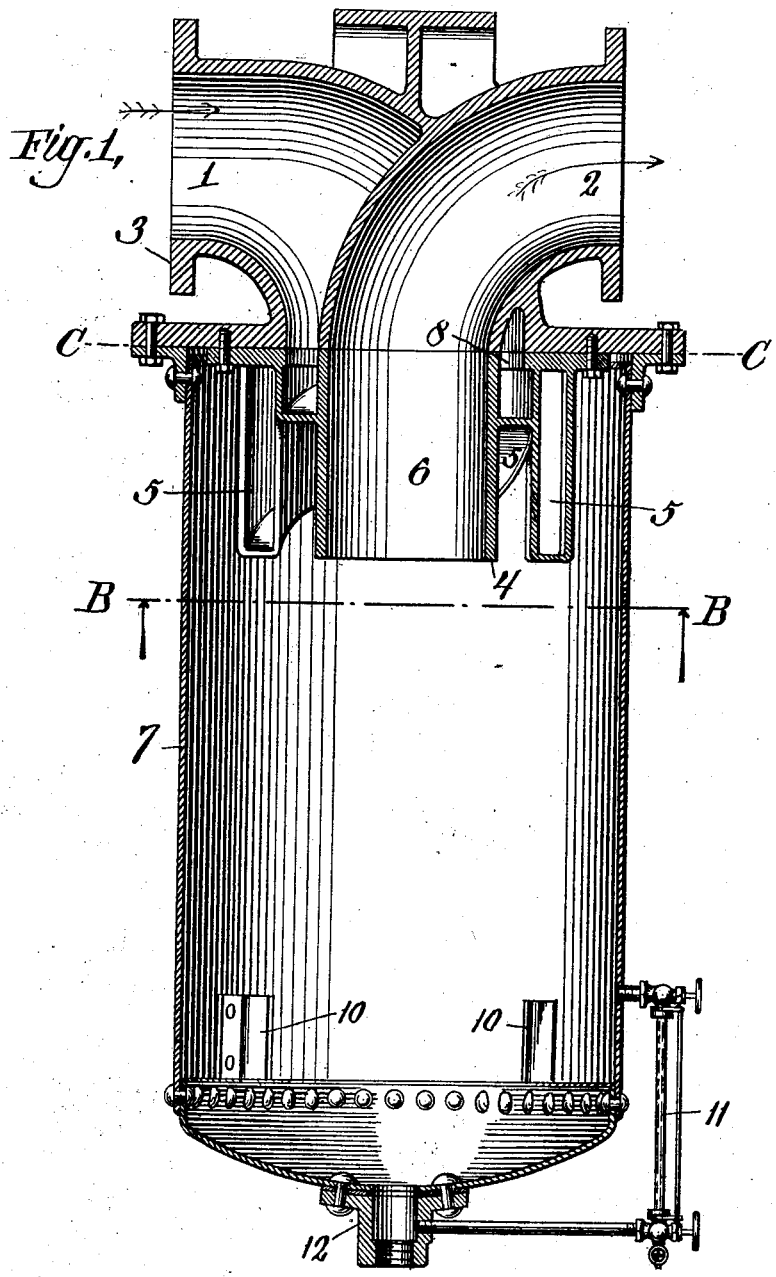

No. 715,649. Patented Dec. 9, 1902.
G. ENGEL.
STEAM SEPARATOR.
(Application filed May 1, 1901.)
(No Model.) 2 Sheets—Sheet 1.

WITNESSES
INVENTOR
Godfrey Engel
BY
ATTORNEYS

No. 715,649. Patented Dec. 9, 1902.
G. ENGEL.
STEAM SEPARATOR.
(Application filed May 1, 1901.)
(No Model.) 2 Sheets—Sheet 2.
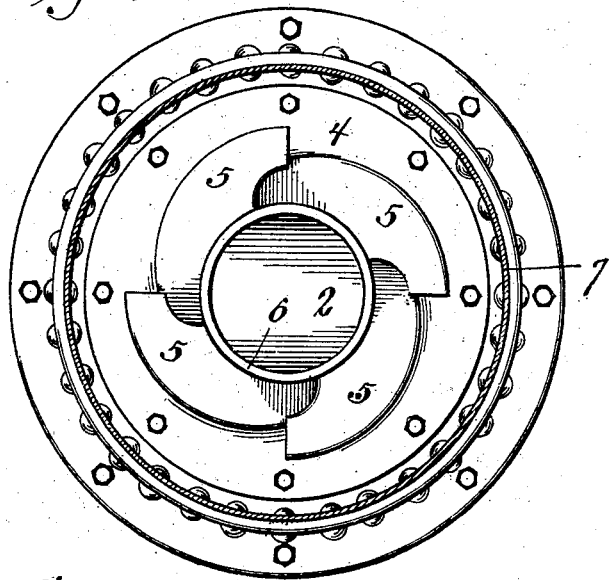
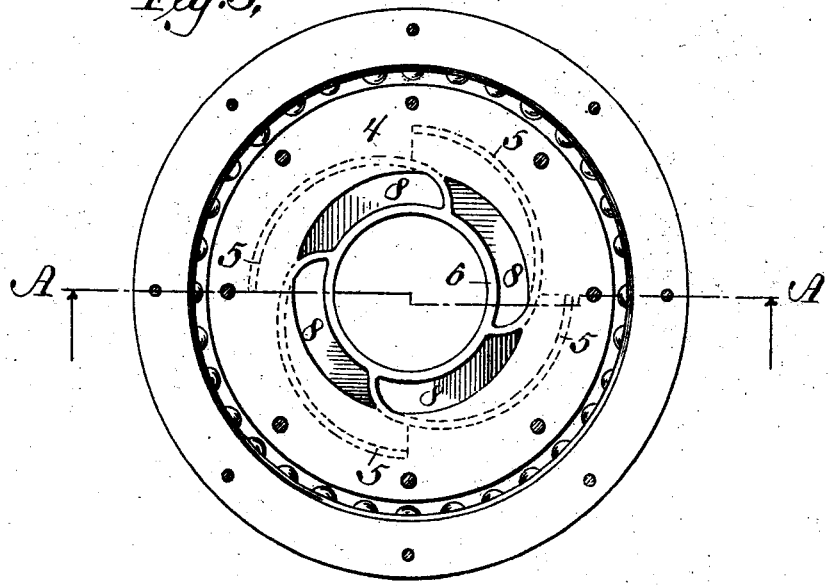
WITNESSES:
INVENTOR
Godfrey Engel
BY
ATTORNEYS

UNITED STATES PATENT OFFICE.

GODFREY ENGEL, OF BALTIMORE, MARYLAND.

STEAM-SEPARATOR.

SPECIFICATION forming part of Letters Patent No. 715,649, dated December 9, 1902.

Application filed May 1, 1901. Serial No. 58,277. (No model.)

*To all whom it may concern:*

Be it known that I, GODFREY ENGEL, a citizen of the United States, residing at Baltimore, in the State of Maryland, have invented certain new and useful Improvements in Steam-Separators; and I do hereby declare the following to be a full, clear, and exact description of the invention, such as will enable others skilled in the art to which it appertains to make and use the same.

My invention relates to separators of the class known as "steam-separators," and is designed for separating liquids from vapors or gases, and particularly for separating water from steam or for separating sugar liquors from vapors during the extraction and refining of sugar.

The objects of my invention are to increase the efficiency and reduce the size of separators of the class above mentioned and to make the separator as simple, compact, and inexpensive as possible. These objects are attained in the separator herein described, and illustrated in the drawings which accompany and form a part of this specification, in which the same reference-numerals indicate the same or corresponding parts, and in which—

Figure 1 is a central vertical section of a separator constructed in accordance with my invention, the section being taken on the line A A of Fig. 3. Fig. 2 is a transverse section of the separator on the line B B of Fig. 1 looking upward, and Fig. 3 is a transverse section of the separator on the line C C of Fig. 1 looking downward.

My improved separator belongs to that type in which steam or other liquid-laden gas or vapor entering near the top of the separator passes downward and in so doing acquires a rotary motion by which the liquid carried by it is thrown to the outside, the steam or other gas then passing upward and out.

In the drawings, 1 indicates the inlet-passage, and 2 the outlet-passage. The relation of these passages may be reversed, and passage 2 may be used for the inlet-passage and passage 1 may be used for the outlet-passage; but the separator works more efficiently when the passage 1 is employed as an inlet-passage and passage 2 as the outlet-passage. The passages 1 and 2 are in an upper section 3 of the separator. Below said section, but secured thereto, is a second section 4, containing a plurality of spiral nozzles 5 (the purpose of which will be mentioned hereinafter) and containing also an outlet-pipe 6, surrounded by such nozzles 5 and forming a continuation of the outlet-passage. Beneath section 3 there is also a section 7, which is closed at the bottom and forms a water-reservoir and steam-chamber. In the lower portion of the upper section 3 of the separator the inlet-passage 1 surrounds the outlet-passage 2.

Upon the upper side of the section 4 of the separator and surrounding the mouth of the discharge-pipe 6 are a series of ports 8, which are the inlets to the nozzles 5, above mentioned. Said nozzles discharge their steam through substantially vertical orifices, Fig. 1, into the lower section 7 of the separator. In the drawings I have shown four such nozzles, though a greater or less number may be used. Steam or other vapor is directed by them in a tangential and nearly horizontal direction, the jets so produced impinging upon the curved sides of the separator and circulating rapidly about the chamber 7 and then curving upward and passing out through the pipe 6. By the centrifugal force generated by the rapid passage of the steam or other vapor through the spiral nozzles 5 and around the chamber 7 after emerging from said nozzles and by the sudden change of direction by the steam when passing into the outlet-pipe 6 free moisture carried by such steam or vapor is thrown well to the outside and downward and collects at the bottom of the separator. Baffle-plates 10, located in the lower portion of the separator and projecting outward, restrict circumferential circulation of the liquid-laden gas in the lower portion of the separator, and therefore serve to facilitate the collection of the liquid at the bottom of the separator. The amount of liquid so collected in the separator may be observed from time to time by means of a gage-glass 11, and the liquid may be drawn off from time to time through the outlet 12, normally closed by a valve. (Not here shown.)

I am aware that separators have been constructed in which steam enters in a tangential direction and in a single stream, impinging against a curved wall and so acquiring a rotary motion by which the moisture carried by the steam is thrown to the outside, the steam itself passing upward through a central outlet-pipe; but such separators do not efficiently utilize the space which they occupy, because the centrifugal action by which the separation of the moisture from the steam is effected is not balanced, the separation taking place mainly upon one side of the separator and not upon all sides alike. Such a separator must necessarily occupy considerably more space than the separator constructed as herein described for equal duties and must be heavier and more expensive, since the major portion of the actual work of separation takes place in such former forms of separators within a relatively small sector of the cross-section of the separating-chamber. In my separator, however, because of the divisions of the entering steam through a plurality of jets by symmetrically-disposed nozzles, giving balanced centrifugal action, the work of separation takes place substantially uniformly in all portions of the cross-section of the separator, thus making it very compact and relatively light and inexpensive. Moreover, the steam when it turns to enter the outlet-passage 6 is in the portion of the separator having the largest effective cross-section. At this point, therefore, the velocity of the steam is lowest and the influence of gravity on the moisture carried by the steam is greatest. The conditions for the separation of the water from the steam are therefore most favorable.

Having thus completely described my invention, what I claim, and desire to secure by Letters Patent, is—

1. In a separator, the combination, with a separating-chamber, and inlet and outlet passages therefor, the outlet-passage having an unrestricted orifice opening directly into the separating-chamber, of a plurality of spiral passages connecting the entrance-passage and the separating-chamber, surrounding the outlet-passage, symmetrically disposed, and arranged to project the entering current into the separating-chamber in equally-spaced jets, whereby a balanced centrifugal action is produced throughout the cross-section of the separating-chamber.

2. In a separator, the combination, with a separating-chamber, and inlet and outlet passages therefor, the outlet-passage projecting into the separating-chamber and having an unrestricted orifice opening directly into said chamber, of a plurality of spiral nozzles connecting the inlet-passage and separating-chamber, surrounding the outlet-passage, symmetrically disposed, and arranged to project the entering current into the separating-chamber in equally-spaced jets, whereby a balanced centrifugal action is produced throughout the cross-section of the separating-chamber.

3. In a separator, the combination, with a separating-chamber, and a top section forming a cover therefor, and having entrance and outlet passages, of a nozzle-section within said chamber provided with an outlet-pipe forming a continuation of the outlet-passage, and with a plurality of spirally-arranged nozzles, surrounding said outlet-pipe, connecting the inlet-passage with the separating-chamber, and equally spaced about said outlet-pipe and adapted to project the entering current into the separating-chamber in equally-spaced jets, whereby a balanced centrifugal action is produced throughout the cross-section of the separating-chamber.

4. In a separator, the combination with a separating-chamber, of a cover therefor having inlet and outlet passages, the latter in communication with the separating-chamber; said cover having also a plurality of nozzles, arranged spirally about the outlet-passage, connecting said inlet-passage with the separating-chamber and projecting into the latter, and equally spaced about the outlet-pipe and adapted to project the entering current into the separating-chamber in equally-spaced jets.

In testimony whereof I affix my signature in the presence of two witnesses.

GODFREY ENGEL.

Witnesses:
T. L. McCLELLAND,
CHRISTOPHER LAUTERBACH.